Dec. 13, 1960  C. O. SOHLBERG ET AL  2,964,592
DEVICE FOR DIALS
Filed April 16, 1958
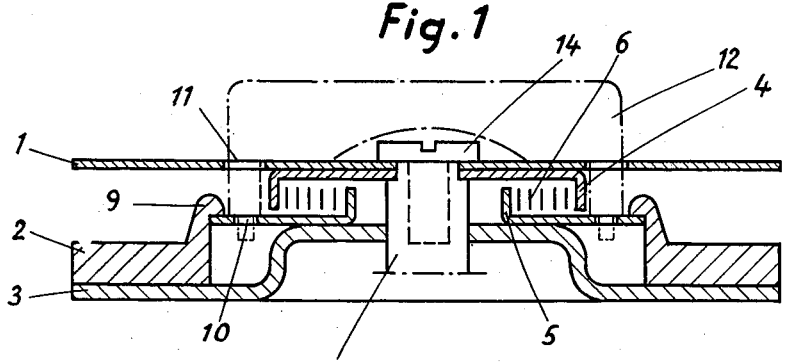
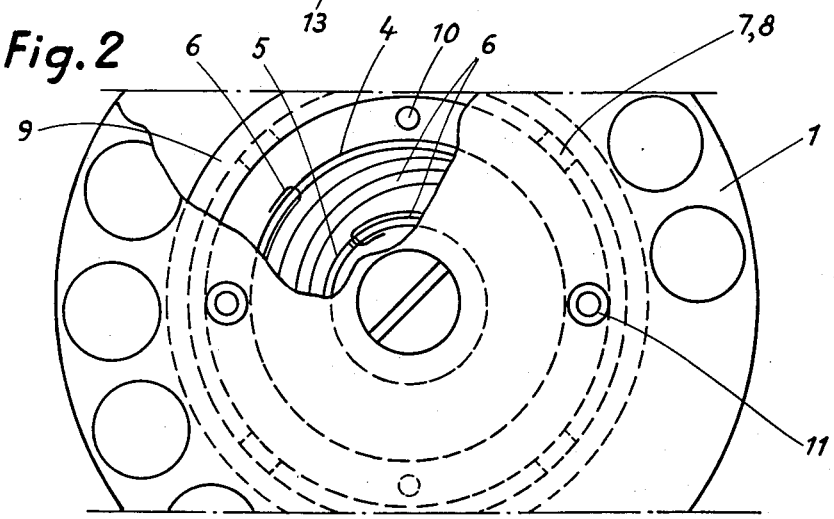
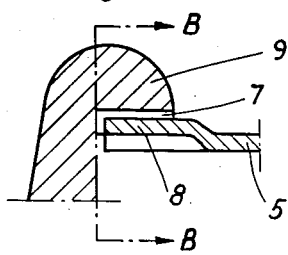
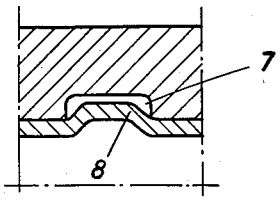
INVENTORS
CARL OSCAR SOHLBERG
OSKAR EDVIN RUDOLF NORDSTRÖM
ATTORNEYS United States Patent Office 2,964,592
Patented Dec. 13, 1960

2,964,592
DEVICE FOR DIALS

Carl Oscar Sohlberg, Stockholm, and Oskar Edvin Rudolf Nordström, Hagersten, Sweden, assignors to Telefonaktiebolaget LM Ericsson, Stockholm, Sweden, a corporation of Sweden Filed Apr. 16, 1958, Ser. No. 728,961

Claims priority, application Sweden Apr. 17, 1957

1 Claim. (Cl. 179—90)

This invention refers to dials used within automatic telephone systems, and more particularly to a device for regulating the spring tension of the driving spring between the finger wheel and the spring washer. The object of the invention is to provide a device which makes it possible to regulate the spring tension in a simple way without dismantling any portions of the dial. According to the invention this is achieved in such a way that the spring washer is elastically and rotatably supported for movement between two different positions beneath a lap connected with the case of the dial. Thus the washer is provided with guide means which engage with corresponding devices in the lap. Furthermore the spring washer is provided with operating members which in a fully mounted dial are accessible from outside so as to make it possible to displace the spring washer between different positions.

For a better understanding of the invention and to show how the same may be carried into effect reference will now be made to the accompanying drawing. Fig. 1 shows a cross section through the upper portions of the dial and Fig. 2 shows the dial as seen from above with the finger wheel partly cut off. Figs. 3 and 4 are details on an enlarged scale showing the steering means of the spring washer. Only those details of the dial which are needed to explain the invention are shown in the drawing. The dial is otherwise supposed to be of normal design.

In the embodiment shown in the drawing the finger wheel 1 and a spring casing 4 are fixed to the central spindle 13 of the dial by means of a screw 14. The driving coiled spring 6, the object of which is to regulate the return motion of the finger wheel is, as appears from Fig. 2, with its outer end fixed to the spring casing and with its inner end to a spring washer 5. This spring washer is made of thin plate and is elastically inserted beneath a lap 9 connected with the digit ring 2. The digit ring is in the usual manner fixed in the case 3 of the dial, the spindle 13 being rotatably mounted in said case 3.

According to the invention the spring washer 5 is on the upper side of its outer edge provided with at least one guide detent means or stud 8, which engages with corresponding indent device or notch 7 on the lap 9, as is shown in Fig. 3 and in the cross section B—B of Fig. 3, shown in Fig 4. In the shown embodiment four notches or four studs have been considered suitable but there is nothing to prevent that more or fewer such ones may be arranged depending on the accuracy that it is desirable to achieve when regulating the spring tension. The spring washer 5 is also provided with one or more holes 10 and the finger wheel 1 is provided with corresponding holes 11 located across the holes in the spring washer. By means of this device it is possible to regulate the spring tension on the driving coiled spring 6 when the finger wheel is mounted in its place. If a pin or key 12 is inserted through the holes 11 and 10, as is shown in Fig. 1, the spring washer may be turned in one or the other direction. Owing to this the detents or studs 8 fall into the indents or notches 7, and the spring washer will be sufficiently locked in place. As a rule, the finger wheel and spring casing must be lifted from the spindle 13 at such a regulation and the spring casing must be turned in the desired direction.

We claim:

In a dial for automatic telephones having a finger wheel and a spindle base member rotatably supporting said finger wheel, a spring yieldably urging said finger wheel into one direction of rotation, said spring comprising a torsion spring fixed at one end to said finger wheel, the spring plate member rotatably supported upon said spindle base member, the opposite end of said torsion spring being connected to said spring plate member, means for maintaining the adjustably rotatable position of said spring plate member upon said spindle base member relative to said finger wheel to adjust the tension of said torsion spring, said means comprising circumferentially spaced apart detents carried by one of said spindle base and spring plate members, circumferentially spaced apart detents defined by the other one of said members releasably receiving said detents, regulating means for rotationally adjusting one of said spring members relative to the other one of said members whereby said spring is regulated, said regulating means comprising aligned apertures in said spindle wheel and said spring plate members slidably receiving a key member therewithin for rotating said spring plate member relative to said spindle base member.

References Cited in the file of this patent

UNITED STATES PATENTS

| | | |
|---|---|---|
| 2,281,994 | Puckette | May 5, 1942 |
| 2,469,974 | McCain | May 10, 1949 |
| 2,543,080 | Wagner | Feb. 27, 1951 |
| 2,716,160 | Pitt | Aug. 23, 1955 |